2,846,430

PROCESSING PINE OLEORESIN

Ray V. Lawrence and Virginia M. Loeblich, Lake City, Fla., assignors to the United States of America as represented by the Secretary of Agriculture No Drawing. Application November 30, 1956
Serial No. 625,558

1 Claim. (Cl. 260—109)

(Granted under Title 35, U. S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to the processing of pine oleoresin.

The crude pine oleoresin ordinarily contains about 4–10% water and trash, 12–20% turpentine, 6–10% nonvolatile neutral matter, and 65–75% resin acids having the empirical formula $C_{20}H_{30}O_2$. It also contains minor amounts of water-soluble impurities—e. g., tannins, low molecular weight fatty acids such as formic, acetic, propionic, butyric, isobutyric and other minor contaminating materials. This crude pine oleoresin is presently processed according to U. S. Patent 2,254,785 which involves diluting the crude oleoresin with turpentine, filtering it, and washing it with water to remove the water-soluble impurities. This cleaned pine oleoresin is then separated from the wash water and heated to about 150° C. while it is sparged with steam (steam distillation) to remove the turpentine and convert the resin acid portion into rosin.

It is well known that during this heating in the steam distillation some of the resin acids are isomerized into other products, thereby producing a rosin with a resin acid composition distinctly different from the composition of the oleoresin. These differences are centered around four of the resin acids which comprise about 50–60% of the acidic portion of the oleoresin—namely, levopimaric acid, l-abietic acid, neoabietic acid, and palustric acid. This group of conjugated-diene acids are frequently referred to as the abietic-type acids, since they can be converted into l-abietic acid by prolonged treatment with heat or mineral acid. During the processing of the oleoresin, levopimaric acid, the most reactive acid present, is converted almost entirely into a mixture of l-abietic, palustric and neoabietic acids, so that the ratios of these four mixed acids in the oleoresin and rosin are quite different (Table I). These percentages are by no means constant for the various types of rosin. They vary depending on the treatment to which the rosin has been subjected until, in some cases, l-abietic acid is the major component present.

TABLE I

Ratio of abietic-type acids present in commercial pine oleoresin and gum rosin

| Acid | Percent of acid present in— | | Rosin heated 3 hrs. at 155° C. |
|---|---|---|---|
| | Oleoresin | Rosin | |
| Levopimaric | 22 | 0 | 0 |
| Palustric | 11 | 20 | 17 |
| l-Abietic | 10 | 18 | 23 |
| Neoabietic | 15 | 19 | 17 |

For practically all the uses of rosin, a clear homogeneous product is desirable. Any product that contains an amount of any one acid in excess of about 30% is not desirable since this individual acid will crystallize from the mixture. The rosin is then a semi-crystalline product containing a mixture of suspended crystalline acids. Such a product is undesirable for many uses and numerous methods have been devised to avoid or to remedy this situation—namely, (1) heating the rosin to a high enough temperature to decompose some of the l-abietic acid, (2) dehydrogenating or disproportionating the rosin to a mixture of dehydroabietic and dihydroresin acids, (3) polymerizing a certain portion of the rosin, and (4) partially neutralizing the rosin with alkali.

Background studies made in connection with the present invention show that the heat induced isomerization of levopimaric and neoabietic acids is caused almost entirely by the carboxyl group present in the resin acid molecule. When the acid group was eliminated from the molecule by converting it to an ester or an alcohol the rate of isomerization was greatly decreased—for example, methyl levopimarate isomerized approximately $\frac{1}{50}$ as fast as the free acid at 155° C., methyl neoabietate was almost entirely stable at 200° C. for prolonged periods of time, and neoabietenol also showed a marked stability at 200° C.

Thus the extent of isomerization of the resin acids during heating is controlled by neutralizing the carboxyl group, in whole or in part (at least 5%, 5 to 60% preferred), by production of non-acidic derivatives—such as esters, alcohols, amides, or metal salts. It is to be understood, of course, that the conversion of the acidic or carboxyl group of the resin acids into non-acidic or less acidic derivatives must be accomplished under such mild conditions that the undesirable isomerizations do not occur during the conversion. For example, an esterification using high temperatures or acid catalysts would be useless but esterifications involving such mild conditions as those encountered using diazomethane would be entirely satisfactory. Another example of a satisfactory method for reducing the acidity of the pine gum acids is the reduction of the carboxyl group to the corresponding alcohol by means of lithium aluminum hydride. The simplest method for reducing this acidity on a commercial scale is merely to neutralize the acids of the crude oleoresin with an aqueous alkali such as sodium hydroxide, sodium carbonate, potassium hydroxide, or similar alkalis, before any appreciable amount of heating has taken place. In this manner a partially or completely neutralized rosin can be prepared which contains various amounts of levopimaric acid. The amount of levopimaric acid remaining in the rosin increases with an increase in the percentage of acids neutralized, until, in the case of complete neutralization, the resin acid composition of the product is virtually the same as that of the original oleoresin.

A series of rosins was prepared from pine oleoresin covering the range of 5–98% neutrality with only minor changes in the present process used for distilling the gum. If not more than half of the resin acids in the oleoresin has been reacted with sodium or potassium hydroxide or carbonate, the partially neutralized resin can be handled by present processing equipment. The only major change is the use of a higher temperature, since the partially neutralized rosin has a higher melting point than a similar rosin which has not been treated with alkali. In those cases where the softening point of the sodium resinate is too high to handle easily, the turpentine can be removed by spray drying or other methods not necessitating fushion of the product. These neutralized rosins may also be prepared using commercial cleaned pine oleoresin (crude oleoresin which has been diluted with turpentine, filtered, and washed to remove the water-soluble acids) as the starting material. Such pine oleoresin contains substantially the resin acids normally present in the crude oleoresin. Thus we have developed a method whereby a material essentially free of turpentine, still containing levopimaric acid, can be prepared.

In the present process, the pine oleoresin is partially neutralized before the levopimaric acid is isomerized, thereby preventing the formation of excessive amounts of abietic acid. The process can be carried out by neutralizing part of the resin acids at any time during the processing. The exact place in the processing and the persent of the acids present that are neutralized will depend on the nature of the product desired. If the maximum levopimaric acid content is desired the acids should be completely neutralized as early in the process as is practicable. If a product low in levopimaric but high in palustric and neoabietic acid is desired the gum rosin can be prepared in the usual manner and then neutralized so that the isomerization of palustric and neoabietic acid over to abietic acid is avoided. If an oleoresin free of water-soluble impurities is desired, the neutralization with alkali must follow the filtering and washing of the oleoresin since if as little as 2 to 3% of the resin acids are neutralized the oleoresin will form very stable emulsions with water and when 5 to 7% of the acids are neutralized the oleoresin can be diluted with water without separating into two layers.

The present process is applicable not only to cleaned pine oleoresin but to any mixtures of abietic-type acids provided these acids are neutralized sufficiently early in the processing; that is, before they have been converted into abietic acid. For example, gum rosin may be partially neutralized soon after it has been made if it is to be shipped by tank car or stored in the molten condition, thereby inhibiting any further isomerization of palustric and neoabietic acids to l-abietic acid.

This principle is also applicable to the resin acid portion of the mixture of fatty acids (high molecular weight fatty acids) and rosin acids that are extracted with alkali or solvent from the sap wood of the pine. The maintenance of a sufficient degree of alkalinity during the processing of such fatty acids and rosin acids will inhibit the isomerization of the rosin acids to l-abietic acid. However, those acids obtained from the black liquor soap in the sulfate pulping process have already been almost completely isomerized to abietic acid. A typical analysis of the resin acid portion of black liquor soap shows the presence of 9% palustric acid; 37% l-abietic acid; 10% neoabietic acid; and 0% levopimaric acid.

The ability to retain levopimaric acid in gum rosin is a highly desirable accomplishment. Of the four conjugated-diene resin acids, levopimaric acid possesses the most reactive system of double bonds and therefore its presence in a rosin means increased reactivity in a variety of reactions—e. g. Diels-Alder type additions, aldehyde modifications, and other reactions involving a conjugated double bond system. Heretofore, the only source of the levopimaric acid has been the entire mass of crude gum since the levopimaric acid is essentially destroyed or isomerized into the much less reactive abietic, palustric and neoabietic acids by the current processing procedures. Another advantage of retaining levopimaric acid in rosin is the fact that the abietic-type acids are distributed over four instead of the usual three components thereby giving a more clear homogeneous mixture which would show less tendency toward crystallization. The levopimaric acid is more resistant to oxidation than abietic acid and the oxidation products of levopimaric acid are not so highly colored as those of abietic acid. Also, the ability to control the amount of levopimaric acid retained by adjusting the extent of neutralization offers a variety of rosins with different degrees of chemical reactivity.

The fact that these partially or completely neutralized rosins can be prepared and handled as a rosin in bulk form offers a solution to the current problems in the handling and shipping of paper size. At present, paper size is shipped in two ways: (1) 60–80% solids in aqueous solution and (2) as a dry powder. The use of aqueous solutions necessitates paying freight on the water and encountering the problems of diluting the concentrated size to the desired concentration. The dry sizes are usually fine, dust-like powders which are subject to rapid oxidation. This rate of oxidation on storage may be so rapid that the heat developed constitutes a serious fire hazard. Oxidized sizes are also darker in color and foam badly when added to paper stock suspensions. The neutralized rosins described by this invention can be handled in bulk form as rosin alleviating the handling and shipping problems. They can also be easily dispersed in water and the required amount of alkali added to make the desired size.

Without further modification other uses for these neutralized rosins include the preparation of soaps and precipitated metal resinates. As a chemical intermediate they may be used to prepare esters by reacting the sodium resinate with chlorinated compounds. When the free acids are needed, they may be obtained by dissolving or suspending, as the case may be, this partially or completely neutralized resin acid mixture in a suitable solvent such as benzene, pentane, octane, or low molecular weight alcohols and acidifying the sodium salts with suitable acids such as acetic, hydrochloric, carbonic or other similar acids. When strong mineral acids are used, care must be taken to avoid excessive amounts of the acids or considerable isomerization may occur at this point.

The following specific examples exhibit preferred methods of operation according to this invention. In the examples and discussion below the term "percent neutralized rosin" refers to that stoichiometric portion of the resin acids which have been neutralized with alkali. The rosins described in Examples 1 through 11 were prepared from commercial pine oleroesin having an $[\alpha]_D = -27.4°$, acid no.$=125.7$, and levopimaric acid content$=21.8\%$. The rosin prepared from this oleoresin by standard distillation methods had an $[\alpha]_D = +14.9°$, acid no.$=168$, grade: WW, softening point$=78.5°$ C. and percent levopimaric acid content$=0$. The grade, acid number, softening point (ring and ball in glycerine), specific rotation (2% in 95% EtOH), and percent levopimaric acid (gravimetric method as described by E. E. Fleck and S. Palkin, Ind. Eng. Chem., 14, 146 (1942)) were determined on each sample. In the determination of the levopimaric acid content on the sodium salt of the rosins, the samples were dissolved in pentane and washed with 2 N acetic acid to remove the sodium ions before adding the maleic anhydride.

EXAMPLE 1

A 12% neutralized rosin was prepared in the following manner: 400 grams of commercial pine oleoresin (acid no.$=128$) were heated to 80° C. A 50% aqueous solution containing 4.0 grams of NaOH was introduced dropwise into the oleoresin and mixed by a stream of $N_2$ gas blowing through the oleoresin. During addition of the alkali the temperature was raised to 110° C. After all the alkali had been added, steam was introduced and the temperature of the oleoresin was increased to 170° C. as the turpentine was removed by distillation until the ratio of turpentine to water in the distillate was less than 1:10. A clear homogeneous rosin resulted that contained 9% levopimaric acid, had an acid no. of 146, $[\alpha]_D + 5.4°$ and a softening point of 84° C.

The method described above is applicable to the preparation of rosins from 5 to 50% neutralization.

EXAMPLE 2

A 74% neutralized rosin was prepared in the following manner: 400 grams of commercial pine oleoresin (acid no.$=128$) were heated to 80° C. A 50% aqueous solution containing 27 grams of NaOH was introduced dropwise into the oleoresin and mixed by a stream of $N_2$ blowing through the oleoresin. After 60% of the acids was neutralized the mixture became a clear homogeneous solution which was filterable and miscible in all proportions with water. At alkali concentrations above 50% neutrality, it was difficult to handle the oleoresin in the ordinary rosin processing equipment. However, the hot solution was sprayed into an evacuated chamber whereby the turpentine and water were easily removed.

It was found that the procedure described above was applicable to the preparations of all rosins between 51 and 100% neutral.

EXAMPLES 3 TO 11

Rosins of varying degrees of neutrality were prepared by the method described in Examples Nos. 1 and 2. The effect of varying the extent of neutralization is shown in the following table.

| Example | Percent Neutralization | Grade | $[\alpha]_D$ | Soft. Pt., °C. | Acid No. | Percent Levopimaric Acid |
|---|---|---|---|---|---|---|
| 3 | 0 | WW | +14.9 | 78.5 | 168.0 | 0 |
| 4 | a 6.7 | M | +7.1 | 81.5 | 156.7 | 5.8 |
| 5 | a 11.6 | M | +5.4 | 83.5 | 148.7 | 8.1 |
| 6 | a 23.9 | M | −12.9 | 87.5 | 127.8 | 13.9 |
| 7 | a 34.4 | M | −17.0 | 92.5 | 110.2 | 16.6 |
| 8 | a 41.0 | M | −16.7 | 85.0 | 99.1 | 16.0 |
| 9 | a 43.1 | M | −17.0 | 99 | 94.2 | 16.4 |
| 10 | b 73.8 | | −23.0 | | 44.0 | 19.0 |
| 11 | b 97.0 | | −27.2 | | 3.5 | 21.0 | a Prepared by method described in Example 1.
b Prepared by method described in Example 2.

The change in specific rotation from +14.9° for the standard rosin to −27.2° for the essentially neutral rosin coupled with the increase in levopimaric acid content as the amount of neutralization increased indicates the extent to which alkali inhibits isomerization. The specific rotation and levopimaric acid content of the original oleoresin and the neutral rosin are in close enough agreement to indicate that essentially no isomerization of the levopimaric acid occurred during the processing of the rosin. Thereby, a neutral rosin was produced which is essentially of the same composition as the non-volatile portion of untreated oleoresin.

Chromatographic and ultraviolet investigation of the percentages of the abietic-type resin acids present in the 43.1% neutral rosin gave the following results: Levopimaric acid, 18%; palustric acid, 13%; l-abietic acid, 13%; and neoabietic acid, 16%. When these values are compared with the percentages of each of the acids in the oleoresin and rosin (Table 1) it is seen that the increase in the palustric, neoabietic, and l-abietic acid percentages is small and that 18% levopimaric acid is still present in the rosin, indicating that the isomerization of the levopimaric acid had been greatly inhibited.

The ultraviolet absorption spectrum of pine oleoresin and rosin is also used as a measure of the changes which occur in their composition. The conjugated-diene resin acids exhibit characteristic maxima at various wavelengths and with various specific extinction coefficients; namely, l-abietic acid, 241 m$\mu$, $\alpha$=77; neoabietic acid, 251 m$\mu$, $\alpha$=80; palustric acid, 266 m$\mu$, $\alpha$=30; and levopimaric acid, 272 m$\mu$, $\alpha$=19. A typical rosin or oleoresin will exhibit its major maximum at 241 m$\mu$, and the specific extinction coefficient at this wavelength is a measure of the amount of l-abietic acid in the sample. In comparing the ultraviolet spectra of pine oleoresin and rosin it is seen that the maximum at 241 m$\mu$ increases from a specific extinction coefficient of 24.8 for the oleoresin to 37.2 for the rosin, showing the formation of l-abietic acid during processing (Figure 2). The spectra of a series of partially neutralized rosins show that as the amount of neutralization is increased, the extent of formation of l-abietic acid is decreased; until, in a completely neutral rosin the ultraviolet absorption spectrum is almost identical to the spectrum of the original oleoresin. Again, it is evident that the isomerization of levopimaric acid has been inhibited by neutralization of the resin acids before distillation, thereby producing, for the first time, a rosin which contains appreciable amounts of levopimaric acid.

EXAMPLE 12

A sample of crude pine oleoresin was completely neutralized with a 15% solution of sodium hydroxide and this neutralized product heated to approximately 100° C. and blown with live steam until essentially all of the turpentine was removed. The viscous solution remaining was sparged with nitrogen to concentrate it further. The final product consisted of a thick solution or suspension containing approximately 30% water and 70% sodium salts of the resin acids of pine gum. These sodium salts had approximately the same composition of the acid portion of the starting pine gum; 21% levopimaric acid, 12% palustric acid, 11% abietic acid and 14% neoabietic acid.

EXAMPLE 13

400 grams of longleaf scrape gum (acid no.=156) were heated to 100° C. 22.3 (0.5 equivalents) of NaOH diluted to 50 cc. with water were added dropwise using a stream of $N_2$ for stirring. The product was then steam distilled until the turpentine-water ratio of the distillate was less than 1:10. The resulting rosin had an $[\alpha]_D$=−27.2, acid no.=88.2, and levopimaric acid content=14.4%.

EXAMPLE 14

400 grams of commercial cleaned pine gum (oleoresin which has been diluted with turpentine, filtered and washed to remove the water-soluble acids), containing 230 grams of resin acids, was shaken in a separatory funnel with 1.5 grams of NaOH (0.05 equivalent) dissolved in 50 ml. of water. A white emulsion formed which did not separate after 24 hours. On the addition of 13.5 grams of NaOH (0.45 equivalents) in 50 cc. of $H_2O$, a clear, homogeneous solution formed immediately which could be diluted in all proportions with water. This solution was steam distilled until the turpentine-water ratio in the distillate was 1:10. The rosin which resulted had a grade=M, $[\alpha]_D$=−21; acid no.=88, softening point=99.5, and levopimaric acid content=18%.

Another sample of cleaned pine gum that had been washed free of water-soluble acid when distilled in the usual manner without any alkali added yielded a WW grade rosin, with $[\alpha]_D$=+14.9, acid no.=168; softening point=78.5° C.; and levopimaric acid content=0.

This data shows that even though the water-soluble acids have been removed by washing of the oleoresin solution prior to processing, the levopimaric acid still isomerizes under standard processing conditions.

EXAMPLE 15

500 grams of commercial cleaned pine gum (oleoresin which has been diluted with turpentine, filtered and washed to remove the water-soluble acids) containing 272 grams of resin acids, was shaken in a separatory funnel with 2.5 grams of sodium carbonate (0.05 equivalent) dissolved in 25 ml. of water. A white emulsion formed immediately which did not separate after 24 hours. This emulsion was then steam distilled until the turpentine-water ratio in the distillate was 1:10. A clear, homogeneous rosin resulted which had a grade=M; $[\alpha]_D$=+3.0°; acid no.=158.0; softening point=82.0° C.; and levopimaric acid content=5.6%.

We claim:

A process comprising neutralizing with aqueous alkali from 5 to 60% of the carboxyl groups of resin acids in a pine oleoresin containing substantially the resin acids normally present in crude pine oleoresin, thereby a stabilize the carbon to carbon linkage of said acids against heat induced isomerization, and removing the water and turpentine from the partially neutralized pine oleoresin by steam distillation to obtain a clear homogeneous rosin.

References Cited in the file of this patent

UNITED STATES PATENTS

Harris et al.: J. A. C. S., vol. 70, page 338.
Palkin et al.: J. A. C. S., vol. 55, page 3680.